PREPARATION OF HYDRAZINE PERCHLORATE HEMIHYDRATE

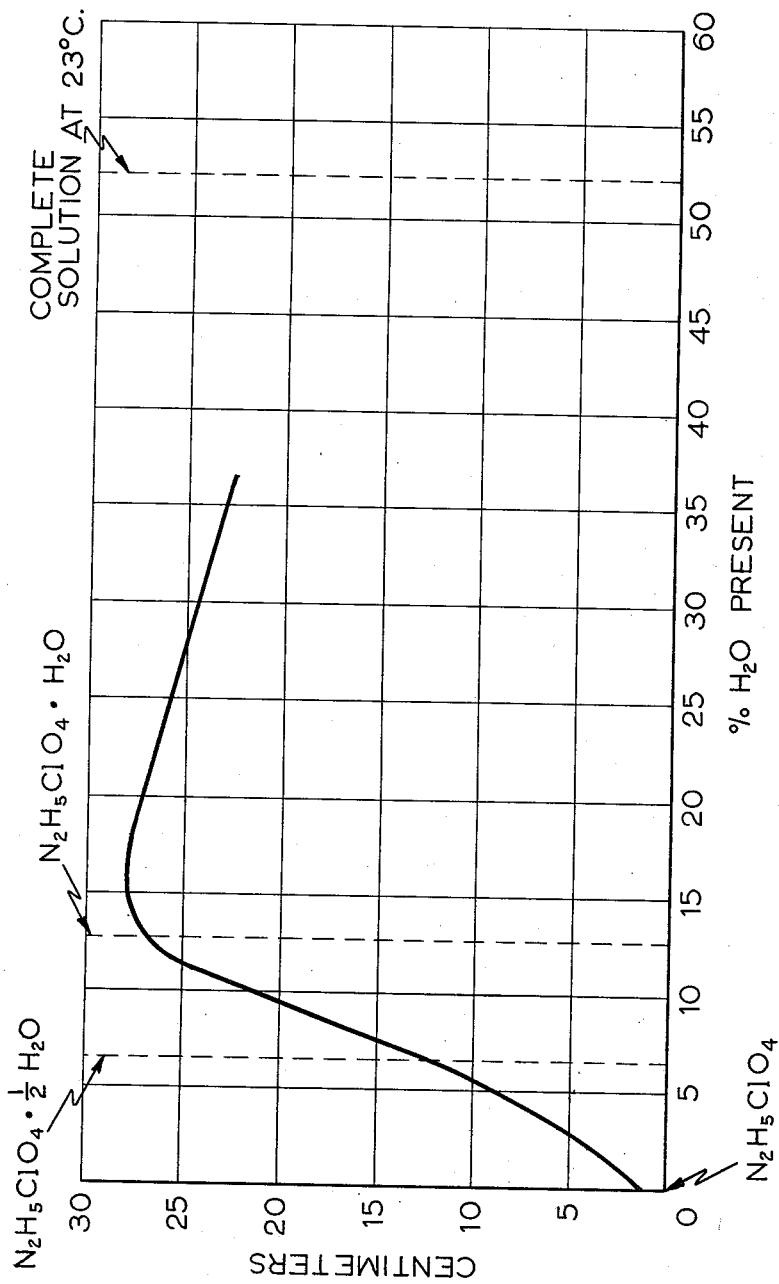

David R. Stern, Fullerton, Calif., assignor to American Potash & Chemical Corporation, a corporation of Delaware
Filed Feb. 13, 1961, Ser. No. 88,899
1 Claim. (Cl. 23—85)

The invention relates to the manufacture of hydrazine perchlorate.

Hydrazine perchlorate is a highly useful material because it contains a high percentage of oxygen and because its high density of 1.939 provides a material of high oxidizing power per unit volume. In addition, its heat of formation is low compared to other perchlorates. When used as an oxidizer, the nitrogen and hydrogen contribute to a lower average molecular weight of exhaust products. All these factors contribute to a high specific impulse in rocketry and hence hydrazine perchlorate is a desirable ingredient as an oxidizer in solid rocket motors. One of its disadvantages, however, is that it is a very sensitive material and in the anhydrous state any impurities present can make it even more sensitive.

In accordance with the present invention I provide a process for the manufacture of hydrazine perchlorate which is very simple. In addition, the resulting product can be readily recovered. Further, and in accordance with the present invention, I utilize ammonium perchlorate as the perchlorate, thus providing other advantages.

The conventional process for manufacture of hydrazine perchlorate is by the reaction of perchloric acid and hydrazine. Perchloric acid is extremely corrosive and sensitive. In addition, since the hydrazine perchlorate forms a hydrate, water can be removed from the system, thus giving rise to the possibility of the formation of anhydrous perchloric acid. This last material decomposes spontaneously with explosive force.

The process of the present invention can be represented as involving the following reaction:

$$N_2H_4 + NH_4ClO_4 \rightarrow N_2H_5ClO_4 + NH_3$$

This reaction is carried out in aqueous solution and the ammonia formed is removed by heating, leaving a solution of hydrazine perchlorate. If a little excess hydrazine is added, almost all of the ammonia can be removed at ambient temperatures. The purity of the product is a direct function of the purity of the raw materials introduced and, since these can be made as pure as desired, the final product is of high purity. Upon cooling the aqueous solution to a temperature below the transition temperature (60°–65° C.) of hydrazine perchlorate to hydrazine perchlorate hemihydrate, the latter will crystallize from the solution. This is a relatively stable material which can be handled with safety.

We have discovered that the sensitivity of the hemihydrate is related to the quantity of water present. Thus, referring to the accompany drawing, I have illustrated graphically the relation between the percentage of water present in the hydrazine perchlorate and the height required to effect detonation of a 20 milligram sample of hydrazine perchlorate containing the indicated amount of water in at least 50% of the trials upon dropping a 2 kilogram weight the distance indicated in centimeters. It will be noted from this that anhydrous hydrazine perchlorate is relatively sensitive to detonation but that this decreases as the water content increases and that between a 5–10% water content the material is relatively insensitive and that this insensitivity increases as one approaches a complete solution. If one, therefore, removes the hemihydrate as a filter cake containing 5–10% water, one will be handling the material in the safest form.

The point of maximum insensitivity corresponds roughly to that of the existence of the monohydrate, $N_2H_5ClO_4 \cdot H_2O$. While this compound has been discussed in literature, so far as I am aware, no one has isolated the material. Nor is it apparent how one would achieve the monohydrate by crystallization from an aqueous medium. It could form as a secondary process in the filter cake as follows:

$$N_2H_5ClO_4 \cdot \tfrac{1}{2}H_2O + \tfrac{1}{2}H_2O \rightarrow N_2H_5ClO_4 \cdot H_2O$$

The hemihydrate may be dehydrated directly by vacuum drying in conventional equipment or by using an organic solvent such as an alcohol or a water azeotroping agent which is compatible with the perchlorate.

The use of ammonium perchlorate involves another advantage, making it unnecessary to remove a second component from the system as a solid salt by evaporation and crystallization. The use of any other metallic perchlorate would require the removal of the second component.

The following example is set forth as illustrative of the present preferred practice of the invention. It is not, however, to be taken as the only possible embodiment inasmuch as those skilled in the art can readily practice the process utilizing other means.

Example I 0.17 mole of commercial anhydrous hydrazine was slowly added to an agitated solution consisting of 0.17 moles of ammonium perchlorate and 4.44 moles of water maintained at a temperature of 27° C. The resulting mixture was gradually heated to a temperature of 100°±2° C. and maintained within this range for approximately 5 hours. Gases evolved from the reactor vessel were passed through a water cooled reflux condenser, and subsequently through two columns containing standard acid solution. Essentially all of the hydrazine was found to have remained in the reactor solution, whereas 63.5% of the ammonia added in the form of ammonium perchlorate was recovered in the absorber solutions. The reaction mixture was again heated and approximately 3.33 moles of water vaporized and the remainder of the ammonia removed. The resulting solution was cooled to about 5° C. and the white crystalline solid filtered off and allowed to air dry for about 16 hours. Analysis of the salt showed 22.3% $N_2H_4$ and 71.1% perchlorate as $HClO_4$, corresponding to composition of hydrazinium perchlorate hemihydrate, $$N_2H_5ClO_4 \cdot \tfrac{1}{2}H_2O$$

This was dehydrated directly in isopropyl alcohol to the anhydrous material, $N_2H_5ClO_4$.

Example II

The procedure of Example I was followed but the heating was continued to effect removal of additional water until the solution was so concentrated that, upon cooling to 70° C., anhydrous hydrazine perchlorate crystallized and was recovered.

I claim:
A process for the manufacture of hydrazine perchlorate hemihydrate comprising adding hydrazine to an aqueous solution of ammonium perchlorate to form hydrazine perchlorate; heating the solution to remove ammonia and water; cooling the solution to a temperature below the transition temperature of hydrazine perchlorate to hydrazine perchlorate hemihydrate to crystallize hydrazine perchlorate hemihydrate from the solution.

References Cited in the file of this patent

FOREIGN PATENTS 1,118,824  France _____ Mar. 26, 1956

OTHER REFERENCES

Schumacher: "Perchlorates, Their Properties, Manufacture and Uses," pages 59, 70, ACS Monograph for 146 (1960), Reinhold Publ. Corp., N.Y.

Schumacher: (see above), pages 100–101.

Gilbert: Journal American Chemistry Society, vol. 53, pages 3956–7 (November 1931).

Mellor: Comprehensive Treatise on Inorganic and Theoretical Chemistry, vol. 2, page 397 (1922), vol. 8, pages 317–318 (1928), Longmans, Green and Co., N.Y.